March 10, 1959 B. D. LOUGHLIN 2,877,295

COLOR-IMAGE-REPRODUCING APPARATUS

Filed Dec. 12, 1955 2 Sheets-Sheet 1

March 10, 1959 B. D. LOUGHLIN 2,877,295

COLOR-IMAGE-REPRODUCING APPARATUS

Filed Dec. 12, 1955 2 Sheets-Sheet 2

United States Patent Office 2,877,295
Patented Mar. 10, 1959

2,877,295

COLOR-IMAGE-REPRODUCING APPARATUS

Bernard D. Loughlin, Lynbrook, N. Y., assignor to Hazeltine Research, Inc., Chicago, Ill., a corporation of Illinois Application December 12, 1955, Serial No. 552,442

8 Claims. (Cl. 178—5.4)

This invention relates to color-image-reproducing apparatus for color-television receivers and, more particularly, to apparatus of the type which employs a cathode-ray image reproducer in which the cathode-ray beam sequentially scans color elements to reproduce a composite image and in which there is developed an indexing signal representative of the scanning frequency and phase of the color elements by the cathode-ray beam. For convenience, such a cathode-ray image reproducer will be referred to hereinafter as a reproducer of the beam-indexing type.

Some prior cathode-ray image reproducers of the beam-indexing type have employed cathode-ray tubes having phosphor screens comprising red, green, and blue light-emissive phosphor stripes disposed in repetitive succession normal to line scan. The color-repetition frequency of the picture signals applied to the cathode-ray tube, that is, the frequency of the color components, is synchronized with the color element scanning frequency. For example, the red color elements may be scanned at a 6-megacycle rate, more or less. The same is true of the blue and green elements. Accordingly, the red, green, and blue color-repetition frequency of the picture signals applied to the reproducer should be 6 megacycles in synchronism with the scanning of corresponding color elements.

Due to nonuniformity of color element scanning caused, for example, by nonuniform distribution of phosphor stripes on the cathode-ray tube screen or by nonlinearities of the line scan, the color element scanning frequency and phase vary across the image raster. Accordingly, in prior reproducers of the beam-indexing type, an indexing signal has been developed at a suitable indexing electrode to synchronize the frequency and phase of the picture signals aplied to the cathode-ray tube with the color element scanning frequency.

Heretofore, reproducers of the beam-indexing type have, in general, employed secondary-emissive strips for developing an indexing signal. However, some secondary emission from surfaces between the indexing strips also occurred. The secondary-emission currents from the indexing strips and the surfaces between the indexing strips varied in accordance with the color signal applied to the cathode-ray beam-intensity control circuit of the cathode-ray tube. Moreover, in order to provide a wide contrast range, a low minimum level of indexing signal was required for reliable operation. Hence, the secondary-emission effects, due to the color signal, caused appreciable color-signal interference with the indexing signal. Accordingly, to minimize color-signal interference with the indexing signal, it has been the practice to derive the indexing signal from the cathode-ray tube as a side-frequency modulation component of a carrier signal introduced into the system and having a frequency of, for example, 52 megacycles.

Moreover, since the electron-gun beam-generating characteristic of the cathode-ray tube was ordinarily nonlinear, harmonic components of the color signal were generated. The frequency of the indexing-signal carrier has, therefore, been selected at a sufficiently high value that the generated harmonic components of the color signal in its vicinity have a small amplitude and the carrier frequency has also been chosen to lie between the color-signal harmonics in order to minimize interference with the indexing signal caused by the harmonics.

Since the color elements of a given set were scanned at, for example, a 6-megacycle rate and the frequency of the color signals applied to the cathode-ray tube was 6 megacycles, the subcarrier harmonic components were spaced in a frequency spectrum by approximately 6 megacycles. As the color element scanning frequency varied due to nonuniformities of line scan, the indexing-signal frequency varied accordingly and the frequency of the color signal applied to the reproducer was caused to vary in like manner. Further, the frequency variation of the generated harmonic components was much greater than the frequency variation of the indexing signal because of the frequency multiplication involved in the generation of the harmonic components. Thus, it has heretofore been necessary to restrict the variations of the indexing signal to a sufficiently small value that interference caused by the color-signal harmonics was minimized. This requirement did not allow wide tolerances in the distribution of the phosphor stripes on the cathode-ray tube face or in the linearity of line scan.

In accordance with the present invention, the indexing signal can be derived with minimum interference from the color signal or its harmonics.

It is an object of the present invention, therefore, to provide a new and improved color-image-reproducing apparatus for color-television receivers which avoids the above-mentioned disadvantages of prior such apparatus.

It is another object of the invention to provide a new and improved color-image-reproducing apparatus of the beam-indexing type which allows greater tolerances in the uniformity of phosphor-strip distribution on the tube face and linearity of line scan.

It is another object of the invention to provide a new and improved color-image-reproducing apparatus of the beam-indexing type in which interference with the derived indexing signal caused by the applied picture signal is minimized.

In accordance with a particular form of the invention, color-image-reproducing apparatus for a color-television receiver comprises cathode-ray image-reproducing means having a display screen comprising color elements and including indexing means for developing an indexing signal representative of the scanning of the color elements by the cathode-ray beam and having a component at a subharmonic frequency of the scanning of the color elements. The apparatus includes frequency-responsive circuit means responsive to the aforesaid component of the indexing signal at the subharmonic frequency for developing a signal representative of that component. The apparatus also includes circuit means coupled to the image-reproducing means for supplying thereto a picture signal representative of the color image to be reproduced. The apparatus also includes means including the supply circuit means and coupled to the frequency-responsive circuit means and responsive to the developed signal for controlling the relation of the scanning of the color elements by the cathode-ray beam and the color repetition of the supplied picture signal, whereby picture-signal interference with the indexing signal is minimized.

For clarity of expression, the term "indexing signal" will be employed to refer to a signal which carries information representing the scanning of the color elements of the display screen although this signal may undergo frequency conversions and also carry additional information in its translation around a complete circuit loop.

For a better understanding of the present invention, together with other and further objects thereof, reference is had to the following description taken in connection with the accompanying drawings, and its scope will be pointed out in the appended claims.

Referring to the drawings.

Figure 1:
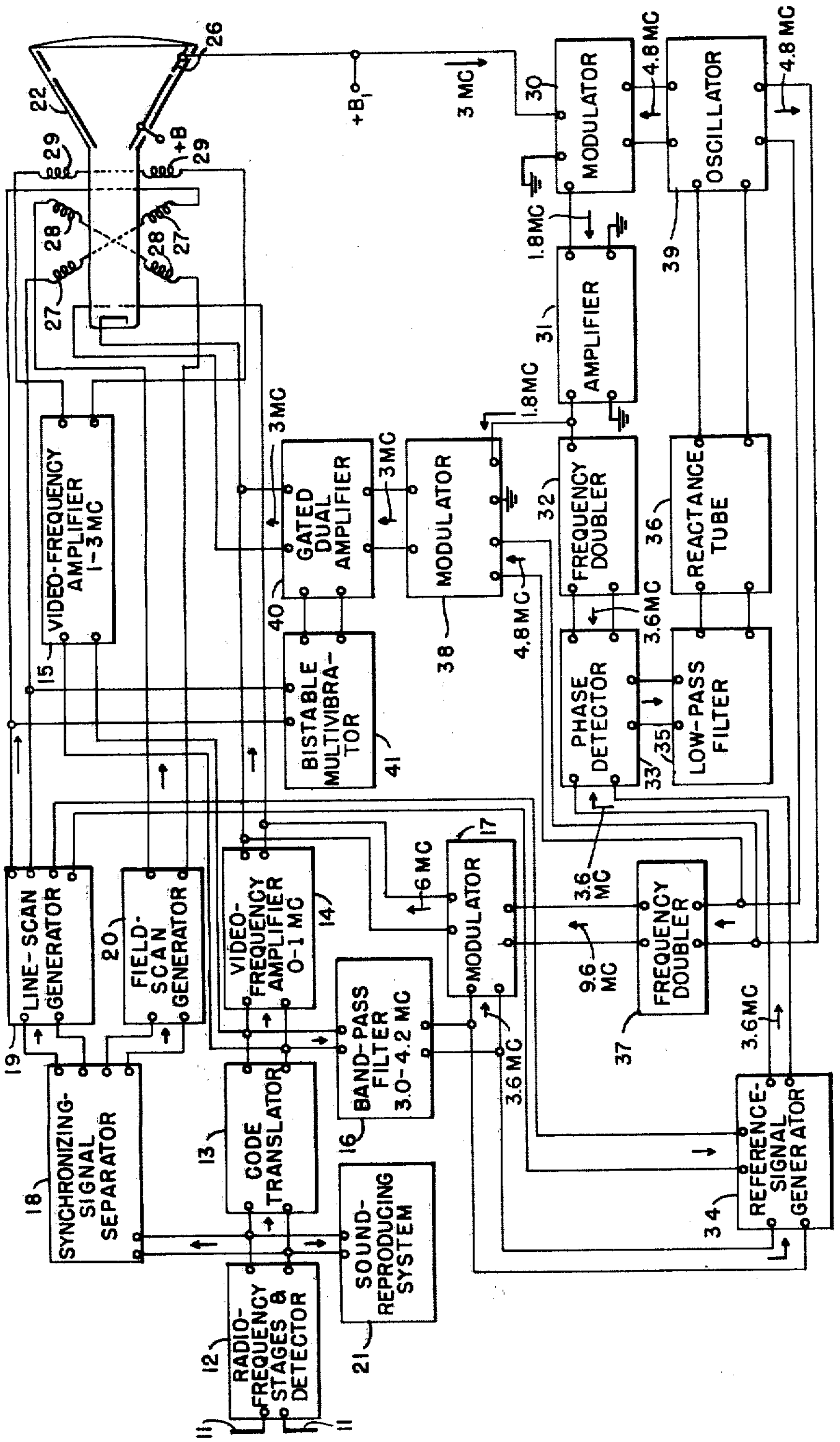
Fig. 1 is a circuit diagram, partly schematic, of a color-television receiver including color-image-reproducing apparatus constructed in accordance with the invention.

Referring now to Fig. 1 of the drawings, the receiver includes an antenna system 11, 11 of conventional construction to which the following are connected in cascade: radio-frequency stages and detector 12 also of conventional construction for deriving video-frequency modulation components of the received television signal with chrominance-signal components at approximately 3.6 megacycles; a code translator 13 of conventional construction, preferably of the type described in an article by applicant entitled "Processing of the NTSC Color Signal for One-Gun Sequential Color Displays," proceedings of the I. R. E., January, 1954 and also known as a Y-to-M converter and subcarrier modifier, for converting the video-frequency modulation components to a so-called dot-sequential signal having chrominance components at approximately 3.6 megacycles and a luminance-correction component; and circuit means comprising video-frequency amplifier 14 having a pass band of, for example, 0–1 megacycle for supplying to a cathode-ray tube 22 a signal primarily representative of the low-frequency luminance components of the composite color image.

There is also coupled to the output circuit of the code translator 13 a video-frequency amplifier 15 having a pass band of, for example 1–3 megacycles for supplying to the tube 22 a signal primarily representative of the high-frequency luminance components of the composite color image, as will be more fully explained subsequently.

There is also provided circuit means for supplying a picture signal representative of the color image to be reproduced. This circuit means comprises a band-pass filter 16 having a pass band of, for example, 3.0–4.2 magacycles for translating the corrected chrominance components to a modulator 17 also included in the picture-signal supply circuit means.

The receiver also includes a suitable synchronizing-signal separator 18 for separating the line-scan and field-scan synchronizing components from the output signal of the detector of unit 12. Line-scan and field-scan means comprising line-scan and field-scan generators 19 and 20, respectively, are responsive to the output signals of the separator 18 and are coupled to the cathode-ray tube for causing the cathode-ray beam to develop an image raster.

The receiver also includes a conventional sound-reproducing system 21 coupled to the unit 12 for reproducing sound in the usual manner.

The color-image-reproducing apparatus of the receiver includes cathode-ray image-reproducing means having a display screen comprising color elements and including indexing means for developing an indexing signal representative of the scanning of the color elements by the cathode-ray beam and having a component at a subharmonic frequency of the scanning of the color elements, as will be fully described subsequently. More particularly, the image-reproducing means includes the cathode-ray tube 22 having a tube face represented in fragmentary view in Fig. 2. The tube face comprises the usual glass surface 23 on which phosphor strips emitting red, green, and blue light, as indicated by the symbols R, G, B, respectively, are disposed normal to the direction of line scan. An aluminum backing surface 24 is disposed over the phosphor strips and indexing elements 25, 25 are repeated across the tube face with spacings substantially equal to the spacings between the color elements of, for example, the red set. The indexing elements may be of any suitable material having a secondary-emission characteristic substantially greater than that of aluminum.

Referring again to Fig. 1, the cathode-ray tube 22 may be of known construction, for example, it may have dual guns with a common cathode for developing a picture beam and a separate indexing beam which is independent of the video signal applied to the picture gun. Alternatively, a one-gun tube may be suitable for some applications. A suitable collector electrode 26 for the secondary-emission electrons is included in the indexing means.

There are also associated with the tube 22 line-scan and field-scan windings 27, 27 and 28, 28 connected to the generators 19 and 20, respectively. Circuit means comprising auxiliary line-scan windings 29, 29 are included in the image-reproducing means and are coupled to the video-frequency amplifier 15 for varying the scanning and, in particular, the line-scan velocity in accordance with the high-frequency luminance of the image to be reproduced, whereby luminance-signal interference with the indexing signal is minimized.

The apparatus also includes circuit means for supplying a subcarrier reference signal synchronized with the color burst of a received composite video signal. The apparatus also includes frequency-responsive circuit means responsive to the component of the indexing signal at the subharmonic frequency of the scanning of the color elements. More particularly, this frequency-responsive circuit means comprises an automatic-phase-control loop responsive to the subharmonic component of the indexing signal and to the subcarrier reference signal for developing a signal having a constant average frequency and an amplified output signal at a desired frequen y with frequency variations of the indexing signal. The phase-control loop comprises a modulator 30 having one input circuit connected to the indexing electrode 26 and another input circuit connected to an oscillator 39 which has its frequency spaced above the frequency of the indexing signal by, for example, 1.8 megacycles and variable in accordance with frequency variations of the indexing signal because of the operation of the loop. The output circuit of the modulator 30 is coupled through an amplifier 31, of conventional construction, and a frequency doubler 32, of conventional construction, to a phase detector 33.

Another input circuit of the phase detector 33 is coupled to a reference-signal generator 34 for deriving a repetitive control signal representative of the phase variations of the indexing signal with respect to the reference signal. A low-pass filter 35 is coupled between the phase detector 33 and a reactance tube 36 for controlling the frequency of the oscillator 39. The low-pass filter 35 may have a translation characteristic similar to that of the corresponding filter described in applicant's copending application Serial No. 507,248, filed May 10, 1955, and entitled "Synchronizing System for Beam-Indexing Color-Television Display."

The apparatus also includes means including the picture-signal supply circuit means and coupled to the frequency-responsive circuit means and responsive to the signal developed by oscillator 39 for controlling the relation of the scanning of the color elements by the cathode-ray beam and the color repetition of the supplied picture signal, whereby picture-signal interference with the indexing signal is minimized. This means includes, in addition to units 16 and 17, a frequency doubler 37 coupled between the modulator 17 and the oscillator 39.

The modulator 17 is coupled to the cathode-ray beam-intensity control circuit of the tube 22 for supplying the picture signal and is responsive to the amplified output signal of the loop for synchronizing the color-repetition frequency of the supplied picture signal and the scanning frequency of color elements by the cathode-ray beam.

The apparatus also includes circuit means coupled to the cathode-ray tube and to the frequency-responsive circuit means for modulating the cathode-ray beam at a subharmonic frequency of the scanning of the indexing elements, for example, one-half the frequency of the scanning. More particularly, this circuit means includes a modulator 38 coupled to the loop and responsive to the constant-frequency signal derived in the output circuit of the amplifier 31 and to the amplified output signal of the oscillator 39 for developing a signal at the aforesaid subharmonic frequency with frequency variations of the indexing signal. This circuit means also includes a gated dual-signal amplifier 40 coupled to the modulator 38 and to the cathode-ray tube 22 for applying the developed signal at the subharmonic frequency to the tube with a 180° phase shift from line to line to modulate the cathode-ray beam. A bistable multivibrator 41 is coupled to the gated dual amplifier 40 and units 40 and 41 constitute circuit means responsive to the line-scan means for shifting the phase of the subharmonic modulation components of the cathode-ray beam from line to line to minimize indexing-signal visibility. For some applications, the indexing-signal visibility may be sufficiently low that units 40 and 41 may be omitted and the output circuit of modulator 38 may then be directly coupled to the indexing gun.

The gated dual amplifier may comprise the elements of conventional construction having parallel signal-translating paths while the multivibrator 41 may comprise a so-called "flip-flop" circuit triggered by the line-scan generator and coupled to a control circuit of the dual amplifier, one section of which translates the indexing signal with a given phase and the other section of which translates the indexing signal with a 180° phase shift relative to the given phase. The bistable multivibrator is effective to maintain one section of the amplifier conductive and one section nonconductive during each line scan and to alternate the conductive sections from line to line.

Considering now the operation of the color-image-reproducing apparatus of Fig. 1, the video-frequency amplifier 14 applies the low-frequency luminance components to the cathode-ray beam-intensity control circuit of the tube 22 to vary the intensity of the cathode-ray beam accordingly. The video-frequency amplifier 15 applies the high-frequency luminance components to the auxiliary line-scan windings 29, 29 to vary the line-scan velocity in accordance with the corrected high-frequency luminance components. By varying the line-scan velocity and, thus, the dwell time of the cathode-ray beam on each color strip, the high-frequency luminance components are reproduced.

The band-pass filter 16 applies the corrected chrominance components to the modulator 17 at a frequency of, for example, 3.6 megacycles. There is also applied to the modulator 17 by the frequency doubler 37 a heterodyne signal at a frequency of 9.6 megacycles and varying in accordance with the frequency variations of the indexing signal, as will be more fully explained subsequently. Accordingly, the modulator 17 derives a 6-megacycle color signal having frequency variations corresponding to the variations in the scanning of the color elements by the cathode-ray beam. The modulator 17 applies the color signal to the cathode-ray beam-intensity control circuit of the tube 22 and, because of the synchronism between the color repetition of the color signals and the scanning of corresponding color elements by the cathode-ray beam, the proper colors are reproduced on the tube face.

There is applied to the indexing gun of the tube 22 a 3-megacycle signal derived in a manner explained subsequently. This 3-megacycle signal introduces a 3-megacycle component in the signal derived at the output electrode 26. The 3-megacycle component is applied to the modulator 30 which is non-responsive to the components of the indexing signal at 6 megacycles and its harmonic frequencies. The modulator 30 responds to the 3-megacycle component of the indexing signal which is free from interference by the color signal at 6 megacycles and its harmonics.

The oscillator 39, which has its average frequency maintained at a substantially constant difference from that of the subharmonic indexing signal applied to the modulator 30, supplies to the modulator 30 a heterodyne signal having a frequency of, for example, 4.8 megacycles. The modulator 30 then derives from the signals applied thereto an output signal having the substantially constant average frequency of, for example, 1.8 megacycles but having phase variations. The term "average frequency" is meant to indicate a frequency averaged over an interval substantially less than the period of line scan but more than the period of the indexing signal. This output signal of modulator 30 is translated through the amplifier 31 and applied to the frequency doubler 32 which derives a 3.6-megacycle signal for application to the phase detector 33.

The reference-signal generator 34 supplies to the phase detector 33 a subcarrier reference signal synchronized with the color burst of the received video signal. The phase detector 33 derives from the indexing signal from unit 32 and the reference signal from unit 34 a control signal representative of the phase variations of the indexing signal with respect to the reference signal. This control signal is translated by the low-pass filter 35 and applied to the reactance-tube circuit 36 which maintains the average frequency of the oscillator 39 at a value substantially 1.8 megacycles above the average frequency of the above-mentioned subharmonic component of the indexing signal. Thus, as the average frequency of the indexing signal applied to the modulator 30 varies, the instantaneous frequency of the output signal of the modulator varies, causing a phase variation with respect to the output signal of the reference-signal generator 34 which is detected by the detector 33 and utilized to vary the average frequency of the oscillator 39 accordingly.

The output signal of the oscillator 39 is applied to the frequency doubler 37 where it is doubled in frequency and then applied to modulator 17 where it beats with the signal supplied by the band-pass filter 16 to derive the 6-megacycle signal having frequency variations corresponding to the scanning variations of the color elements in the cathode-ray tube, as previously described.

The output signals of the oscillator 39 and the amplifier 31 are also applied to the modulator 38 wherein they beat to derive a 3-megacycle signal varying in accordance with the frequency variations of the indexing signal. The modulator 38 applies the 3-megacycle signal to the gated dual amplifier 40 which translates the signal with one phase during one line scan and with a 180° phase shift during the next line scan under the control of the bistable multivibrator 41 which is triggered by the flyback portions of the output signal of line-scan generator 19. The amplifier 40 applies the 3-megacycle indexing signal to the cathode-ray tube 22, as previously described. The alternate phasing of the indexing signal during successive line scans causes a visual cancellation of the pattern due to the indexing signal on successive line scans.

Figures 2, 3:
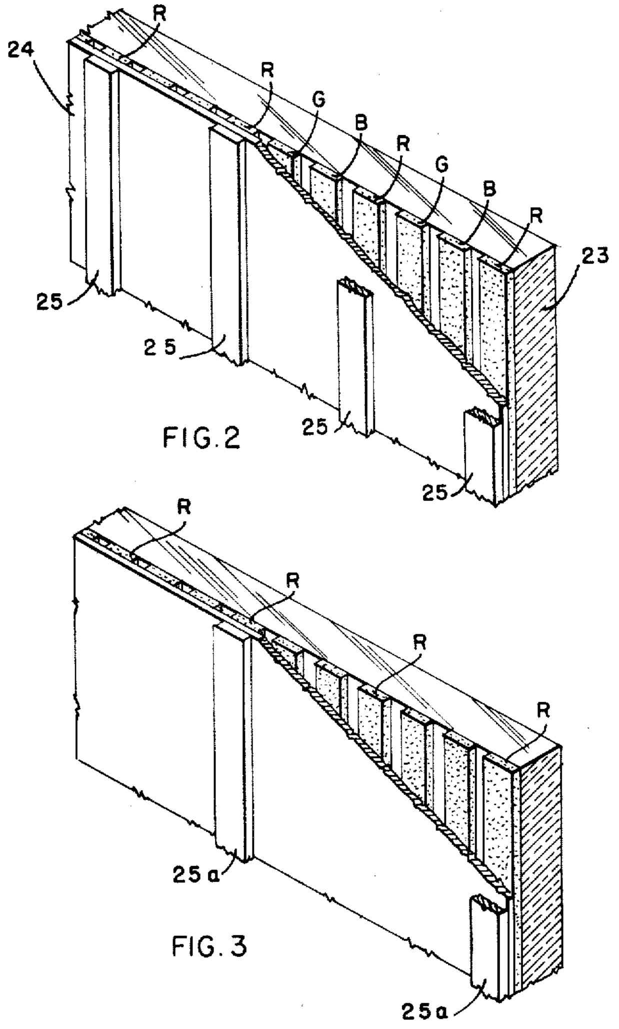
Fig. 2 is a fragmentary perspective view of a portion of the color-image-reproducing apparatus of Fig. 1.
Fig. 3 is a fragmentary perspective view of a portion of color-image-reproducing apparatus constructed in accordance with a modified form of the invention.

Referring now more particularly to Fig. 3, it will be apparent that an indexing signal having a subharmonic component can be derived from the cathode-ray tube without employing the units 38, 40, and 41 of Fig. 1. Such an indexing signal may be so derived if the cathode-ray tube includes indexing elements adjacent the tube face and repeated across the tube face with spacings, for example, twice as wide as the spacings between color elements of a given set. For example, the indexing elements 25a, 25a of Fig. 3 are repeated with a spacing twice as wide as the spacing between the red phosphor strips, designated R. Such a tube would be employed in apparatus of the type represented in Fig. 1 with identical circuit connections except that the units 38, 40, and 41 would be eliminated.

From the foregoing description it will be apparent that, because the indexing signal has a component at a subharmonic of the color element scanning frequency, there is no interference between the color signal and the utilized component of the indexing signal. Thus, greater variations of the indexing frequency may be tolerated, allowing greater tolerances for variations in the stripes of the color tube and nonlinearities of scanning.

Also when employing an apparatus constructed in accordance with the invention, it is not necessary to employ a carrier for the indexing signal, thus eliminating the carrier-signal generator and its associated circuits. Further, because the high-frequency luminance components may be applied to the image-reproducing apparatus to vary the scanning velocity to reproduce high-frequency luminance, interference between the high-frequency luminance components and the component of the indexing signal at subharmonic frequency is minimized.

Moreover, it will be apparent that while the Fig. 1 system provides synchronization between the color element scanning frequency and the color-repetition frequency of the applied picture signals by controlling the color-repetition frequency of the picture signals, the invention is also applicable to systems which provide synchronization by controlling the color element scanning frequency by, for example, controlling the instantaneous sweep slope of the output signal of the line-scan generator.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Color-image-reproducing apparatus for a color-television receiver comprising: cathode-ray image-reproducing means having a display screen comprising color elements and including indexing means for developing an indexing signal representative of the scanning of said color elements by the cathode-ray beam and having a component at a subharmonic frequency of the scanning of said color elements; frequency-responsive circuit means responsive to said component of said indexing signal at said subharmonic frequency for developing a signal representative of said component; circuit means coupled to said image-reproducing means for supplying thereto a picture signal representative of the color image to be reproduced; and means including said supply circuit means and coupled to said frequency-responsive circuit means and responsive to said developed signal for controlling the relation of the scanning of said color elements by the cathode-ray beam and the color repetition of said supplied picture signal, whereby picture-signal interference with said indexing signal is minimized.

2. Color-image-reproducing apparatus for a color-television receiver comprising: image-reproducing means including a cathode-ray tube having a display screen comprising color elements and including indexing elements adjacent the tube face and repeated across the tube face with spacings substantially equal to the spacings between color elements of a given set for developing an indexing signal representative of the scanning of given color elements by the cathode-ray beam; frequency-responsive circuit means responsive to a component of said indexing signal at a subharmonic frequency of the scanning of said indexing elements for developing a signal representative of said component; circuit means coupled to said cathode-ray tube and coupled to said frequency-responsive circuit means and responsive to said developed signal for modulating the cathode-ray beam at said subharmonic frequency of the scanning of said indexing elements; circuit means coupled to said tube for supplying thereto a picture signal representative of the color of the composite color image to be reproduced; and means including said supply circuit means and coupled to said frequency-responsive circuit means and responsive to said developed signal for controlling the relation of the scanning of said given color elements by the cathode-ray beam and the color repetition of said supplied picture signal, whereby picture-signal interference with said indexing signal is minimzed.

3. Color-image-reproducing apparatus for a color-television receiver comprising: image-reproducing means including a cathode-ray tube having a display screen comprising color elements and means including indexing elements adjacent the tube face and repeated across the tube face with spacings substantially equal to the spacings between color elements of a given set for developing an indexing signal representative of the scanning of given color elements by the cathode-ray beam; frequency-responsive circuit means responsive to a component of said indexing signal at one-half the frequency of the scanning of said indexing elements for developing a signal representative of said component; circuit means coupled to said cathode-ray tube and coupled to said frequency-responsive circuit means and responsive to said developed signal for modulating the cathode-ray beam at one-half the frequency of the scanning of said indexing elements; circuit means coupled to said tube for supplying thereto a picture signal representative of the color image to be reproduced; and means including said supply circuit means and coupled to said frequency-responsive circuit means and responsive to said developed signal for controlling the relation of the scanning of said given color elements by the cathode-ray beam and the color repetition of said supplied picture signal, whereby picture-signal interference with said indexing signal is minimized.

4. Color-image-reproducing apparatus for a color-television receiver comprising: image-reproducing means including a cathode-ray tube having a display screen comprising color elements and including indexing elements adjacent the tube face and repeated across the tube face with spacings substantially equal to the spacings between color elements of a given set for developing an indexing signal representative of the scanning of given color elements by the cathode-ray beam; line-scan and field-scan means coupled to said cathode-ray tube for causing the cathode-ray beam to develop an image raster; frequency-responsive circuit means responsive to a component of said indexing signal at a subharmonic frequency of the scanning of said indexing elements for developing a signal representative of said component; circuit means coupled to said cathode-ray tube and coupled to said frequency-responsive circuit means and responsive to said developed signal for modulating the cathode-ray beam at said subharmonic frequency of the scanning of said indexing elements; circuit means coupled to said tube for supplying thereto a picture signal representative of the color image to be reproduced and coupled to said frequency-responsive circuit means and responsive to said developed signal for controlling the relation of the scanning of said given color elements by the cathode-ray beam and the color repetition of said supplied picture signal; and circuit means responsive to said line-scan means and coupled to said beam-modulating circuit means for shifting the phase of the subharmonic modulation components of said cathode-ray beam by 180° from line to line, whereby picture-signal interference with said indexing signal and indexing-signal visibility are minimized.

5. Color-image-reproducing apparatus for a color-television receiver comprising: image-reproducing means including a cathode-ray tube having a display screen comprising color elements and including indexing elements adjacent the tube face and repeated across the tube face with spacings substantially equal to the spacings between color elements of a given set for developing an indexing signal representative of the scanning of given color elements by the cathode-ray beam and having a component at a subharmonic frequency of the scanning of said given color elements; line-scan and field-scan means coupled to said cathode-ray tube for causing the cathode-ray beam to develop an image raster; circuit means for supplying a subcarrier reference signal synchronized with the color burst of a received composite video signal; an automatic-phase-control loop responsive to said subharmonic component of said indexing signal and to said subcarrier reference signal for developing a signal having a constant average frequency and an amplified output signal at a desired frequency with frequency variations of said indexing signal; a modulator coupled to said loop and responsive to said constant-frequency signal and said amplified output signal for developing a signal at said subharmonic frequency with frequency variations of said indexing signal; gated dual-signal repeater means responsive to said line-scan means and coupled to said modulator and to said cathode-ray tube for applying said developed signal at said subharmonic frequency to said tube with a 180° phase shift from line to line to modulate the cathode-ray beam accordingly; and a modulator coupled to said cathode-ray tube for supplying thereto a picture signal representative of the color image to be reproduced and responsive to said amplified output signal of said loop for synchronizing the color-repetition frequency of said supplied picture signal and the scanning frequency of said given color elements by the cathode-ray beam, whereby picture-signal interference with said indexing signal is minimized.

6. Color-image-reproducing apparatus for a color-television receiver comprising: cathode-ray image-reproducing means having a display screen comprising color elements and including indexing elements adjacent the tube face and repeated across the tube face with spacings substantially twice as wide as the spacings between color elements of a given set for developing an indexing signal representative of the scanning of given color elements by the cathode-ray beam and having a component at a subharmonic frequency of the scanning of said given color elements; frequency-responsive circuit means responsive to said component of said indexing signal at said subharmonic frequency for developing a signal representative of said component; circuit means coupled to said image-reproducing means for supplying thereto a picture signal representative of the color image to be reproduced; and means including said supply circuit means and coupled to said frequency-responsive circuit means and responsive to said developed signal for controlling the relation of the scanning of said given color elements by the cathode-ray beam and the color repetition of said supplied picture signal, whereby picture-signal interference with said indexing signal is minimized.

7. Color-image-reproducing apparatus for a color-television receiver comprising: cathode-ray image-reproducing means having cathode-ray beam-intensity control means and having a display screen comprising color elements and including indexing means for developing an indexing signal representative of the scanning of said color elements by the cathode-ray beam; circuit means coupled to said image-reproducing means for supplying thereto a color signal representative of the color of the composite color image to be reproduced; means including said supply circuit means and responsive to said indexing signal for controlling the relation of the scanning of said given color elements by the cathode-ray beam and the color repetition of said supplied color signal; circuit means coupled to said cathode-ray beam-intensity control means for supplying thereto a signal primarily representative of the low-frequency luminance components of the composite color image; circuit means for supplying a signal primarily representative of the high-frequency luminance components of said composite color image; and circuit means included in said image-reproducing means for effecting scanning of said color elements by said cathode-ray beam and including means coupled to said high-frequency luminance component supply circuit means for varying the scanning in accordance with the high-frequency luminance of the image to be reproduced, whereby luminance-signal interference with the indexing signal is minimized.

8. Color-image-reproducing apparatus for a color-television receiver comprising: cathode-ray image-reproducing means having cathode-ray beam-intensity control means and having a display screen comprising color elements and including indexing means for developing an indexing signal representative of the scanning of said color elements by the cathode-ray beam and having a component at a subharmonic frequency of the scanning of said given color elements; frequency-responsive circuit means responsive to said component of said indexing signal at said subharmonic frequency for developing a signal representative of said component; circuit means coupled to said image-reproducing means for supplying thereto a color signal representative of the color of the composite color image to be reproduced and means including said supply circuit means and coupled to said frequency-responsive circuit means and responsive to said developed signal for controlling the relation of the scanning of said given color elements by the cathode-ray beam and the color repetition of said supplied color signal; circuit means coupled to said cathode-ray beam-intensity control means for supplying thereto a signal primarily representative of the low-frequency luminance components of said composite color image; circuit means for supplying a signal primarily representative of the high-frequency luminance components of said composite color image; and circuit means included in said image-reproducing means for effecting scanning of said color elements by said cathode-ray beam and including means coupled to said high-frequency luminance component supply circuit means for varying the scanning velocity in accordance with the high-frequency luminance of the image to be reproduced, whereby color-signal and luminance-signal interference with the indexing signal are minimized.

References Cited in the file of this patent

UNITED STATES PATENTS

| | | |
|---|---|---|
| 2,657,257 | Lesti | Oct. 27, 1953 |
| 2,671,129 | Moore | Mar. 2, 1954 |
| 2,677,723 | McCoy | May 4, 1954 |
| 2,742,531 | Partin | Apr. 17, 1956 |